United States Patent
Willemsen et al.

(10) Patent No.: US 11,602,723 B2
(45) Date of Patent: Mar. 14, 2023

(54) MODULAR ADDITIVE MANUFACTURED REACTOR SYSTEM

(71) Applicant: 3D-CAT B.V., Bergen (NL)

(72) Inventors: Johannes Arnoldus Maria Willemsen, Bergen (NL); Gabriel Francis De Scheemaker, Bergen (NL)

(73) Assignee: 3D-CAT B.V., Bergen (NL)

( * ) Notice: Subject to any disclaimer, the term of this patent is extended or adjusted under 35 U.S.C. 154(b) by 0 days.

(21) Appl. No.: 16/960,160

(22) PCT Filed: Jan. 4, 2019

(86) PCT No.: PCT/NL2019/050004
§ 371 (c)(1),
(2) Date: Jul. 6, 2020

(87) PCT Pub. No.: WO2019/135678
PCT Pub. Date: Jul. 11, 2019

(65) Prior Publication Data
US 2020/0346181 A1    Nov. 5, 2020

(30) Foreign Application Priority Data

Jan. 5, 2018 (NL) .................................... 2020239
Apr. 20, 2018 (NL) .................................... 2020804

(51) Int. Cl.
*B01J 19/00* (2006.01)
*B01J 19/24* (2006.01)
*B33Y 80/00* (2015.01)

(52) U.S. Cl.
CPC ....... *B01J 19/0053* (2013.01); *B01J 19/0013* (2013.01); *B01J 19/2485* (2013.01);
(Continued)

(58) Field of Classification Search
CPC ................ B01J 19/0053; B01J 19/0013; B01J 19/2485; B01J 19/2445; B01J 19/245;
(Continued)

(56) References Cited

U.S. PATENT DOCUMENTS 6,049,160 A    4/2000 Safari et al.
8,277,743 B1 * 10/2012 Ramberg .................. F01N 3/28
                                                                    422/600
(Continued)

FOREIGN PATENT DOCUMENTS

WO    WO-2013/050764 A1    4/2013
WO    WO-2017/106915 A1    6/2017
WO    WO 2018/178312    * 10/2018

OTHER PUBLICATIONS

Notification Concerning Transmittal of International Preliminary Report on Patentability (IPRP) from corresponding PCT Application No. PCT/NL2019/050004, dated Jul. 16, 2020.
International Search Report from corresponding PCT Application No. PCT/NL2019/050004, dated Jun. 24, 2019.

*Primary Examiner* — Lessanework Seifu
(74) *Attorney, Agent, or Firm* — Harness, Dickey & Pierce, P.L.C.

(57) ABSTRACT

The present invention relates to a modular reactor system for carrying out processes comprising mixing, chemical reactions, heat exchange and/or separations, the reactor system comprising of at least one additive manufactured module, the module each performing at least one process unit operation, and optionally, an external housing.

23 Claims, 4 Drawing Sheets

(52) U.S. Cl.
CPC .............. *B01J 2219/0002* (2013.01); *B01J 2219/00004* (2013.01); *B01J 2219/00036* (2013.01); *B01J 2219/0079* (2013.01); *B01J 2219/00824* (2013.01); *B01J 2219/185* (2013.01); *B01J 2219/2422* (2013.01); *B01J 2219/2423* (2013.01); *B01J 2219/2428* (2013.01); *B01J 2219/2445* (2013.01); *B33Y 80/00* (2014.12)

(58) Field of Classification Search
CPC .......... B01J 19/248; B01J 2219/00004; B01J 2219/00009; B01J 2219/00011; B01J 2219/00013; B01J 2219/0002; B01J 2219/00036; B01J 2219/00038; B01J 2219/0004; B01J 2219/2428; B01J 2219/2445; B01J 2219/2422; B01J 2219/2423; B01J 2219/185
See application file for complete search history.

(56) References Cited

U.S. PATENT DOCUMENTS

| | | | |
|---|---|---|---|
| 9,446,366 B2* | 9/2016 | Makatsoris | B01J 8/067 |
| 10,124,333 B2* | 11/2018 | Bhargava | B01L 3/502707 |
| 2015/0027036 A1* | 1/2015 | Janajreh | B01J 8/065 |
| | | | 422/651 |
| 2018/0045405 A1* | 2/2018 | Fitzsimmons | C10L 5/04 |
| 2018/0301725 A1* | 10/2018 | Lo | B01J 19/242 |
| 2019/0366290 A1* | 12/2019 | Hofmann | B01J 8/067 |

* cited by examiner

MODULAR ADDITIVE MANUFACTURED REACTOR SYSTEM

CROSS-REFERENCE TO RELATED APPLICATIONS

This application is a national phase application of PCT Application No. PCT/NL2019/050004, filed on 4 Jan. 2019, which claims benefit of Netherland Patent Application Nos. 2020239, filed on 5 Jan. 2018 and U.S. Pat. No. 2,020,804, filed on 20 Apr. 2018. The entire disclosure of the applications identified in this paragraph are incorporated herein by references.

The present invention relates to a modular, industrial scale multiunit reactor system, a process for its manufacture, and use. More specifically, the invention concerns a reactor system comprising a multitude of additive manufactured (AM) reactor sections.

Much attention has been given in the past and is still given at the present moment to the scale-up of chemical processes, which in most cases results in the scale-up of chemical reactors. Usually it is more efficient to employ a large scale reactor, and large scale separation units, rather than a multitude of independently and parallel operated smaller reactor and work-up sections.

In particular in the (petro)chemical industry, gas-gas; gas-liquid; liquid-liquid processes such as mixing of reactants, chemical conversions, related heat transfers(such as e.g. heating or cooling), and separation processes (such as e.g. sorption (adsorption and desorption), application of membranes, diffusion, distillation, evaporation and drying), are normally carried out in different pieces of equipment. As a consequence, the processing facilities of this industry tend to be large, which in turn leads to high capital and operational expenditures.

An important requirement for such industrial scale chemical reactors and separation units is that they are designed to operate in a predictable fashion within a certain operational window, typically at almost full load. It is important that the reactor operates within a safe set of conditions, with a predictable output and product quality, at predictable costs. Operation at lower or higher turnover levels may negatively affect the economics and efficacy as well as safety significantly. Also, changing the scale of a reaction may alter the heat removal and mixing characteristics in a reaction zone, which may result in differences in temperature and concentration profiles. This may in turn result in a change of productivity, selectivity, catalyst deactivation, and many other factors in the reactor as well as the clean-up and separation sections. In particular, such conventional reactors require optimization of the material and heat flows in the reactor and sections before and thereafter.

Also, often in heterogenic catalytic reactors, catalyst beds are randomly distributed and hence do not provide efficient flow and active surfaces everywhere in a reactor, with hot spots and areas with limited circulation as a result.

Other reactor types such as stirred tank reactors require the presence of baffles and active mixing and stirring elements. Yet further heat exchange is difficult as the surface available for the exchange is limited, while at the same time the inclusion of heat exchangers in an operable manner is cumbersome.

Rather than simply increasing the size either in diameter and/or height, and/or throughput of existing reactor designs, including adaptation of the reactor internals, catalyst beds, mixing internals, heating/cooling system, feed lines/feed distribution, product withdrawal and the like, the present invention seeks to standardize mixer, reactor and separator internals by use of well-defined modules, by using one or more reactor sections that are of certain, preferably identical, modular dimensions, and that can be combined and operated as one single unit.

The present invention therefore relates to a reactor system suitable for carrying out chemical reactions and/or separations, the system comprising of one, two or more modular reactor sections.

The present invention therefore relates to a modular reactor system for carrying out mixing and/or chemical reactions and/or separations, the reactor system comprising at least one, preferably two or more consecutive ceramic module(s), each performing at least one reaction or unit operation (such as e.g. mixing, heat exchange and separation), and optionally, an external housing In a particularly preferred embodiment, the present invention relates to a modular reactor system for carrying out processes on an industrial scale comprising mixing, chemical reactions, heat exchange and/or separations of chemical reactants and/or (by)products, the reactor system comprising of at least one additive manufactured module, the module being configured for performing at least one process, and optionally, an external housing.

In a separate preferred embodiment, the subject reactor system may be employed for medical processes, such as dialysis. Unit operations herein refer to reactions and transport processes, such as blending and mixing and transport of materials in general, as well as heat exchange and separations. Each of the modules may comprise more than one unit operation, such as mixing and reacting, or mixing and heat exchange, or reaction and/or mixing and heat exchange, and/or separation steps, or all of the above.

Preferably, as defined herein, a unit-operation comprises mixing catalyzed and non-catalyzed reactions, heat exchange, and/or product separation. This is the invention in its broadest form and it can be modified by including any of the features defined in the embodiments described below, either separately or in any combination.

In a further aspect, the present invention relates to a process for forming a module for a modular reactor system, the method comprising the steps of: a. providing a ceramic precursor additive material; b. depositing at least one ceramic precursor additive material in subsequent layers to form a three-dimensional structure comprising at least one pro-ceramic cavity, at least one pro-ceramic cavity having a geometric surface area; and c. firing the ceramic additive material, to form a ceramic carrier structure having at least one ceramic cavity defined therein.

For example, ceramic reactor modules may be used to separate gaseous components from the reaction stream to form preferred product gas streams. Similarly, reactant gases are sometimes supplied to the ceramic membrane reactor at elevated pressure from prior chemical unit operations. It is also sometimes desirable for reaction products to be supplied at elevated pressure to increase the chemical driving force or to prevent expensive decompression/compression steps.

BRIEF DESCRIPTION OF THE DRAWINGS

The following drawings illustrate preferred embodiments of a system according to the invention.

Figure 1:
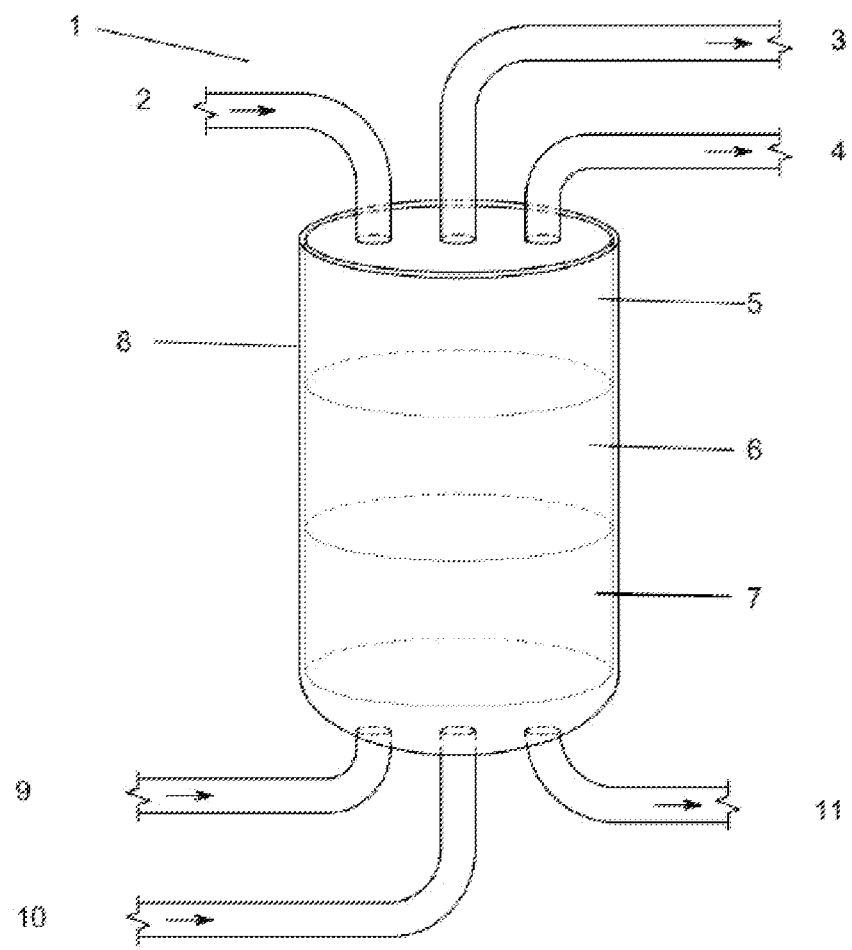
FIG. 1 depicts a side view of a reactor 1 comprising three modules 5, 6 and 7, and reactor vessel 8. A flow of a cooling medium (assuming an exothermic reaction in this illustration) enters the system from inlet 2, and exits from an outlet 11; reactant streams 9 and 10 enter the system from below, whereas product streams 3 and 4 leave the reactor.

The present invention preferably relates to a reactor system (see FIG. 1) wherein an industrial scale process has an entrant fluid minimum flow rate of at least 5 liters per hour. Preferably, one or more modules comprise a reaction space having a mean major diameter of at least 5 cm, and a mean major height of at least 10 cm. Preferably, a system comprises at least two consecutive modules. Preferably, the module or modules are at least in part composed of ceramic material.

Preferably, the process activity comprises at least two of mixing, adsorption and/or desorption, optionally catalyzed and/or uncatalyzed chemical reactions, heat exchange, and/or product separation.

The reactor modules are typically positioned with a gas- and/or fluid-tight seal between the modules and ceramic or metallic substrates of the reactor.

Chemical reactor modules based upon ceramic membranes may include structures to support the active ceramic membranes between reactant and product gases, to supply reactant gases, to remove product gases, and to isolate reactants from products. Depending upon the details of the reactor, these structures can include various metallic or ceramic membrane holders, manifolds and substrates. In the reactor system the reactor modules must also be reliably sealed to product and other fluid flows. Such seals must be gas-tight and able to sustain the operating conditions of the reactor, including the elevated temperatures and pressure gradients, without adversely affecting the ceramic materials. Operating conditions for reactors, in particular if essentially formed form ceramic materials, may include pressures up to 1000 Bar absolute and temperatures up to 1200° C., but usually the reactors operate at pressures of up to 500 Bar absolute and temperatures up to 500° C., preferably in a temperature range of from 150 to 450° C. Since ceramic material is substantially gas-impermeable, it may divide a reactor into an oxidation zone and a reduction zone, unless designed to act as a selective membrane. The seals must also be physically and chemically stable to provide reliable operation over the lifetime of the module. The seals must further be substantially gas-impermeable and able to withstand exposure to strongly oxidizing and reducing atmospheres, including hydrocarbons, hydrogen, alcohols, H2S, NOx, water, oxygen, and air. Preferably, in particular for high temperature processes, a temperature-dependent self-sealing system may be applied that makes use of the heat expansion coefficients of the seal materials.

A main advantage of the described reactor system is the fact that a rather small system can replace a whole set of separate operational units, combining a multitude of reactor modules and operating it as one single unit with common reactant feed lines and common product discharge lines. This presents a significant step forward in the current industry trend of process-intensification. Further advantages are the lower weight of the individual reactor modules, making transport/handling/lifting/maintenance easier. It will be appreciated that the size of a reactor may be restricted by workshop limitations, road limitations bridge limitations, lifting equipment limitations and the like.

The standardized size of form factors for connections as well as reactor modules may also allow different providers/ more companies to produce the reactor.

As the reactor system is operated as an integrated single unit, there are fewer workforces needed to operate the unit from the control room.

From a process control point of view there is no difference between one large reactor line-up and the reactor system of the present invention: the reactor system of the present invention is operated in the same way as one single large reactor. In general, the heat-up/cool-down rates for the reactor system according to the present invention will be faster than for large conventional reactor set-ups.

The above described reactor system is especially useful for strongly corrosive reactions, since it is largely made from non-corrosive materials, It may also offer to perform highly exothermic reactions due to the very high cooling rates obtainable due to built-in heat exchange circuits; but also optionally including electrical heaters, or the integration of conductive alloys such as Kanthal, resulting in an relatively high amount of cooling internals inside the reactor. The same applies for highly endothermic reactions as a result of very high heating rates due to built-in heat exchange circuits and/or (electrical) heaters.

The reactor system according to the present invention suitably comprises at least one, preferably between two and more than fifty single units operated reactor modules, typically between three and over forty single unit operated reactor modules, more preferably comprises at least ten modules.

Usually a reactor system will comprise a more or less conventional reactor housing or vessel, i.e. an elongated cylindrical reactor wall, which, when in use, will be a vertical reactor. It is preferred that all reactor modules are located in one reactor vessel. Preferably, all reactor sections have the same size and form factor, and also comprise hoisting lugs for insertion and removal of the modules. However, this is not essential, and different sizes of reactors may be used. It will be appreciated that in that case measures have to be taken that the feed is distributed in the desired ratio over the reactor modules. The reactor modules will preferably be operated in series. The modules may be stacked on top of each other in a vertical fashion, or may be placed against each other in a horizontal way, or in any way between these two orientations.

A reactor module may comprise of one or more catalyst sections, such as zones where a ceramic structure is covered with an appropriate active material for the required catalytic activity. Where large heat generation may take place, e.g. in strongly exothermic processes, the reactor modules preferably each comprise an indirect heat exchange system.

Depending on the chemical reaction to be carried out, gaseous and/or liquid feeds are to be introduced in the reactor system. All possible reactor flow regimes may be used, i.e. up-flow and/or down flow, co-current and/or counter-current. Also gas and/or liquid recycles may be used.

In the case of heterogeneous catalytic reactions one or more different catalysts may be used in different sections or modules. In a preferred embodiment, preferably the same catalyst may be used in all reactor sections. In an alternative embodiment, different catalysts may be employed, even if employed in the same sections, advantageously as overlapping layers.

An exemplary catalyst may be directly bound-metal catalyst, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst preferably is in the form of a metal, but may be present as an inorganic compound, such as an oxide, nitride and carbide, or as a defect structure within the ceramic grains of the catalyst support. The metal may be applied by any suitable technique, such as those known in the art. For example, the metal catalyst may be applied by washcoat and/or chemical vapour deposition.

A further exemplary catalyst is one that is incorporated into the lattice structure of the ceramic grains of the modules. For example, an element may be Ce, Zr, La, Mg, Ca, a metal element described in the previous paragraph or combinations thereof. These elements may be incorporated in any suitable manner, such as those known in the art.

Yet a further exemplary catalyst may comprise a combination of ceramic particles having metal deposited thereon. These are typically referred to as wash coats. Generally, wash coats consist of micrometer-sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash coat catalyst coating is one comprised of alumina particles having a noble metal thereon. It is understood that the wash coat may be comprised of more than one metal oxide, such as alumina having oxides of at least one of zirconium, barium, lanthanum, magnesium and cerium. Yet a further exemplary catalyst may be formed by and deposited on the catalyst support by calcining at a temperature of from 280° C. to 2850° C.

In higher throughput situations and processes, when a reactor cannot be printed or otherwise additive manufactured in one piece, as described above, a modular flow reactor is typically formed of a plurality of modules, wherein each module comprises a body having at least one conduit passing through it, and wherein a plurality of modules are preferably aligned along a longitudinal axis (e.g. stacked) such that the conduits of the modules are aligned to form a passage for the reaction fluids (gas/liquid) and a heat exchange medium. Preferably, each module has a length along the longitudinal axis, which is less than the length of the module perpendicular to the longitudinal axis. The modules may be separate "slices", or a plurality of modules can form a slice; the slices may then be aligned linearly so that the conduits form a tube.

In one embodiment, each module has a length along the longitudinal axis, which is less than the length of the module perpendicular to the longitudinal axis.

The technical advantage of providing the modules in slices is that they can be constructed by using additive printing techniques, in particular 3D-printing, as well as by conventional manufacturing techniques. This reduces manufacturing costs and results in a number of other benefits.

In its broadest form, this invention is thus concerned with a new type reactor system that is modular, scalable and reconfigurable. Preferably, the reactor system combines at least two processes in the same space.

The reactor comprises of any number of standard modules that, once assembled together, combine into a continuous flow chemical reactor system of a desired length. A module comprises a number of conduits, the diameters of which could vary, that once assembled together form a reactor system. In addition, a section comprises additional conduits for allowing flow of heating or cooling medium.

As well as the manufacturing advantages mentioned above, other advantages of this sectioned design include: ability to line cavities with for example chemically reactive or catalytic material; use ceramics that have chemically reactive properties, such as catalytic or sorbent material; ability to take apart for cleaning and reassembly; ability to assemble into any length, width and depth; compactness; ability to add monitoring and measuring ports or injection ports attached to each cavity; integrated temperature control via cooling or heating fluid flow or inserted electrical heating elements (such as alloys and/or coils); ability to combine a variety of reactor-designs into the same compact arrangement including a mixture of standard plug flow with baffled flow designs; and the ability to include blades instead of standard straight walled orifice for different mixing regimes. In addition, the design can act as a standard platform that can be replicated to repeat reliably reaction processes only by selecting and assembling the same number and design of modules.

Figure 2:
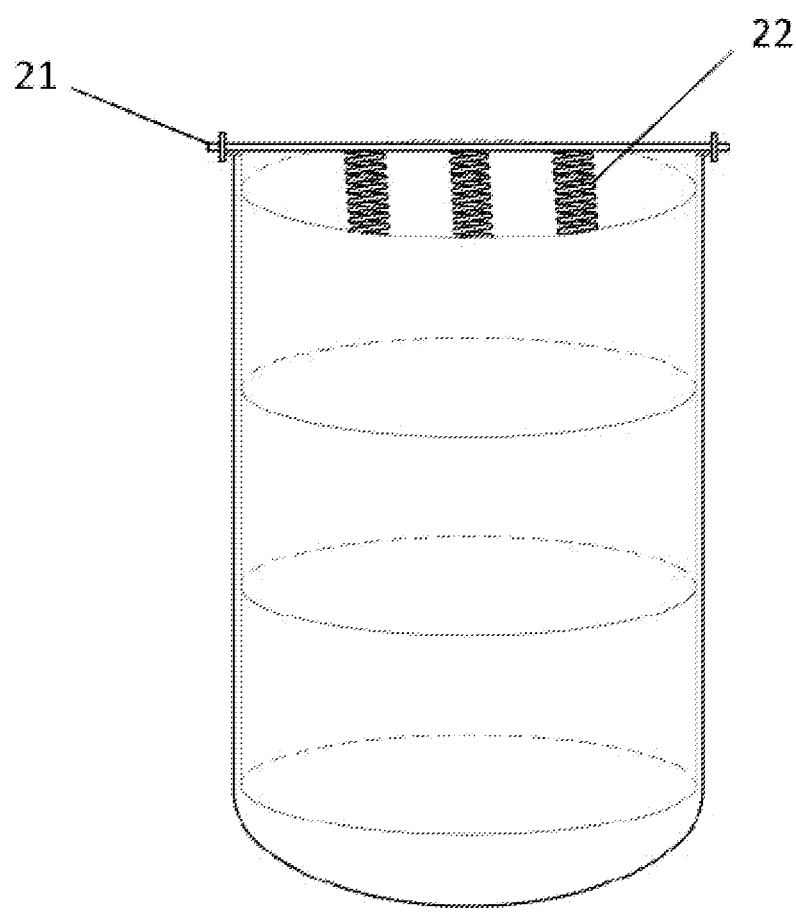
FIG. 2 shows a preferred way of keeping the modules in place by tension elements (e.g. springs) 22 that press upon the modules.

In another embodiment, the reactor comprises at least one reinforcing element for linking the modules together. This may include keeping the modules in place in a vertical reactor by one or more springs or similar tension mechanisms, whereby a lid of the reactor may keep the tension on a module stack, as visible for instance in FIG. 2. This mechanism may vary according to the reactor set-up, e.g. in the case of a horizontal reactor set-up.

Figure 3:
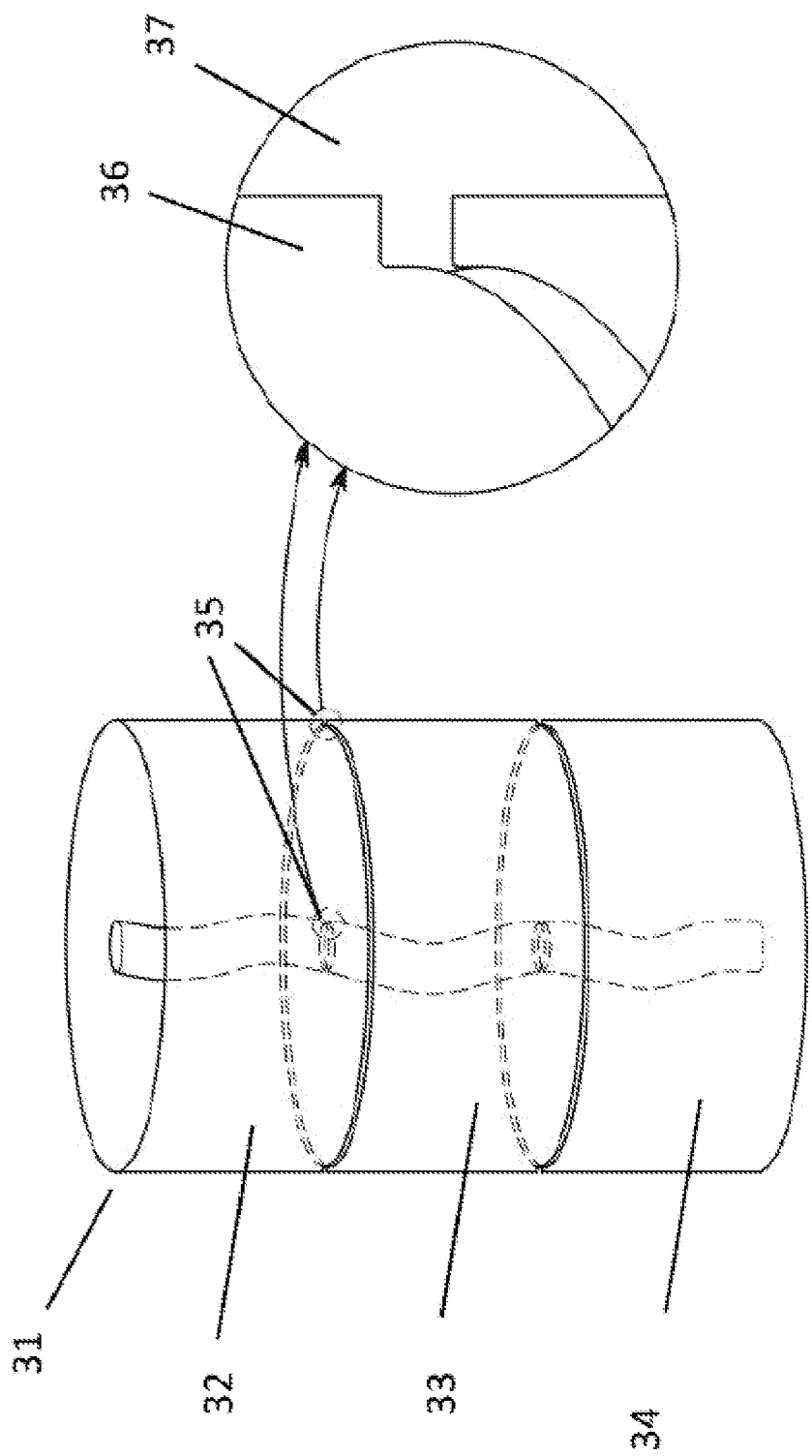
FIG. 3 depicts a stack of modules 31 that are adapted to fit with the previous and following module 32 with 33 and 33 with 34 via an optionally co-printed male 36-female 37 connection 35.

The reactor may have a plurality of the passages in parallel. In a preferred embodiment, the reactor additionally comprising at least one end-connection for fitting to at least one end of the reactor, comprising at least one conduit operable and equipped to allow the attachment of standard connectors, as set out in FIG. 3. The male-female connection depicted in FIG. 3 may be applied for all channel connections between the various modules, to ensure full closure and prevent leakages. The form of the male-female connection can by any form that is known to industry today, e.g. an "edgy" transition or a "smooth" transition).

Figure 4:
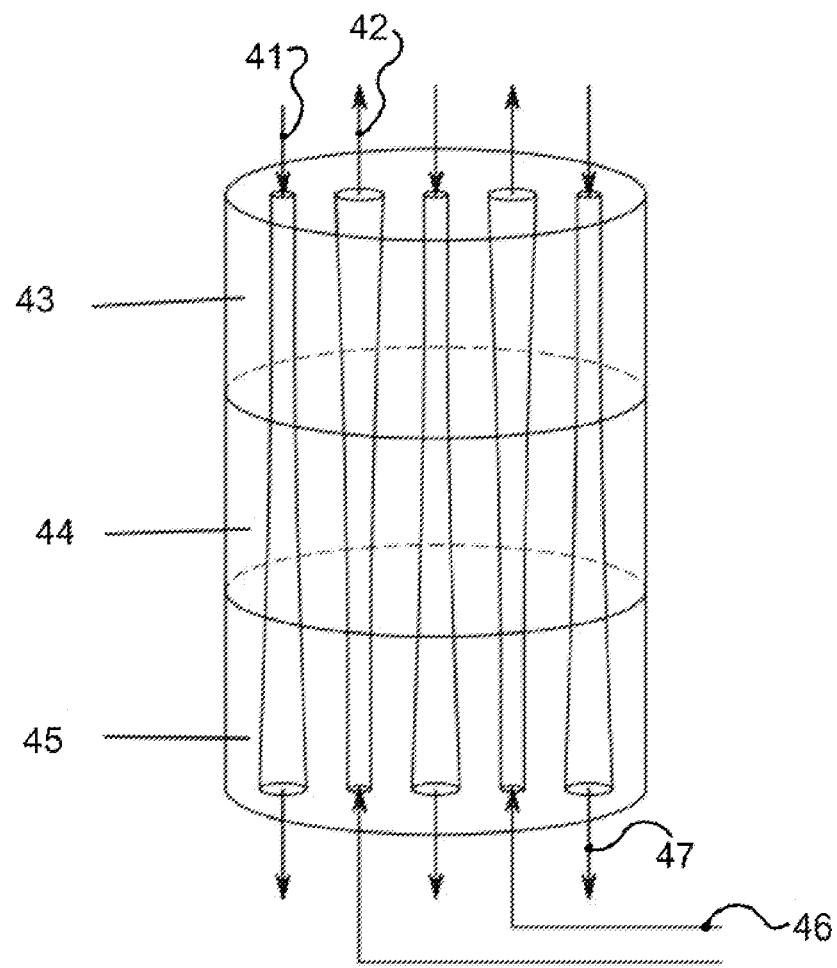
FIG. 4 shows schematically a system comprising three elements 43, 44, 45 that are adapted to fit to each other, and further shows the reactant 46 and product flow 42, and counter-flow cooling in 41 and out 47. Herein the channels connecting the modules are formed such that a user could adapt the diameter of the reaction channels as well as the coolant channels thereby increasing the efficacy of the reactor system. In this illustration of an exothermic reaction the preferred reaction channels start with a small diameter and are surrounded by cooling channels with a large diameter, as the need to remove heat is the highest at the beginning of a reaction.

In another embodiment in which the reactor has at least two passages formed by the alignment of conduits, the module comprises a connector to fluidly connect the passages together, as set out for instance in FIG. 4.

It will be appreciated that a reactor preferably has multiple passages, in which case the module may be designed to connect multiple passages to each other to create parallel and/or sequential flow paths through the reactor and/or to provide connection points for external tubes (FIG. 4).

The reactor system in its broadest form may include at least one module which has at least one baffle to disrupt flow of fluid through said at least one conduit. The baffle and the body of the module are preferably integrally formed. However, the reactor may also have at least one module, which is baffle-free.

In a preferred embodiment, the baffle is a region in the conduit of reduced internal diameter. The internal diameter of the region of the baffle is preferably about half of the internal diameter of the conduit in the baffle-free region. Independently, the length of the region of the baffle along the longitudinal axis of the conduit may be about a quarter of the length of the baffle-free region of the conduit.

An important technical advantage of the reactor system is that it can be constructed from modules with differing functionality depending on the needs of the user.

For example, modules can be provided with one or more of the following functionalities: a port for allowing access to at least one conduit; whereby the port may be connected to a fluid injection device; a fluid measuring device; a fluid monitoring device;

a catalyst section positioned so as to contact any gas/fluid flowing through the at least one conduit, preferably provided in the conduit lining; support material positioned so as to contact any fluid flowing through at least one conduit; and/or a membrane for separating components of a fluid passing through it.

In a further aspect of the present invention, there is provided a single module as defined above. In a preferred embodiment, a face of a module body at one end of the conduit has a projection, and a face of the module body at an opposite end of the conduit may have a corresponding depression, whereby the projection can engage with a depression on a second identically shaped module when the two conduits are aligned (FIG. 4).

In a further aspect of the invention, there is provided a section for a modular flow reactor, comprising a body having at least one conduit passing there through along a first axis and at least one baffle to disrupt flow of fluid through said at least one conduit, wherein the body is configured such that the conduit of the body and the conduit of a second identical section can be aligned to form a passage for fluid in a modular flow reactor, wherein the modules are integrally formed.

The modular reactor system according to the invention as described herein above may advantageously be applied in the (petro-, fine-) chemical industry, but also in the area of air treatment, such as for supplying oxygen deprived air to fruit containers, emission management, e.g. off-gases of ship, truck and locomotive engines as well as standalone generator sets, environmental processes, e.g. water treatment, life-sciences (e.g. pharmaceuticals production) and medical applications, e.g. dialysis.

The process activity to be performed in the modular reactor system according to the invention as described herein above preferably comprises at least two of mixing, adsorption and/or desorption, optionally catalyzed and/or uncatalyzed chemical reactions, heat exchange, and/or product separation.

The modular reactor system according to the invention as described herein above preferably comprises at least two different modules for performing at least two different processes, preferably a combination of mixing and chemical reactions, a combination of a chemical reaction and heat exchange; a combination of a chemical reaction and a separation, or combinations/mixtures thereof, preferably, wherein at least one module is configured to perform at least two processes. More preferably, the reactor system comprises between 2 and more than 50 reactor modules arranged in a stacked manner and consecutive order according to a product flow direction.

Preferably, the modules are arranged in a flow direction according to any of the 6 spatial directions, preferably, wherein the flow direction is essentially horizontal or vertical; preferably, wherein the system comprises at least one layer comprising several horizontally positioned, for instance in a 2D-honeycomb structure, optionally interconnected, modules, preferably wherein each layer is connected to a next layer in a vertical direction.

In the modular reactor system according to the invention as described herein above, at least one reactor module preferably comprises one or more mixing sections, preferably forming a static mixer.

In the modular reactor system according to the invention as described herein above, at least one reactor module preferably comprises one or more catalyst and/or sorbent sections.

In the modular reactor system according to the invention as described herein above, at least one reactor module preferably comprises a passive, and/or active heat exchange system, preferably an active heat exchange system.

In the modular reactor system according to the invention as described herein above, at least one reactor module preferably comprises a separation unit.

In the modular reactor system according to the invention as described herein above, at least two modules preferably comprise common reaction chambers and/or heat exchange fluid medium channels lines connected to one another, wherein the reactor chamber volume and/or heat exchange channel volume at an initial chamber in a first module is different from the reactor chamber or channel volume in a second consecutive module.

In the modular reactor system according to the invention as described herein above, at least one reactor module preferably comprises a ceramic carrier structure defining at least one ceramic cavity, at least one ceramic cavity having a defined surface area and defined geometry.

Preferably, the module ceramic structure is a monolithic three-dimensional multi-layered ceramic structure. Such structures include, but are not limited to 3D-honeycomb structures.

The modular reactor system according to the invention as described herein above, at least one reactor module preferably comprises further connector members for linking modules and/or modules and general inlets and outlets of the reactor system, and preferably also comprising connectors between modules and connecting conduits, and more preferably also comprising installation and removal members, preferably executed as hoisting lugs, and connectors for attaching modules to each other.

In the modular reactor system according to the invention as described herein above, modules are preferably designed and shaped to connect in at least two of the 6 directions, and comprising flow channels in all 6 directions for flow of reactants, end-product and cooling/heating, optionally with individually controlled flow-through varying channel diameters over the height/width of the module. Such connectors preferably comprise at least one standardized form-factor for each kind of connector. In the modular reactor system according to the invention as described herein above, a module preferably is sized and designed to a standardized form-factor.

In the modular reactor system according to the invention as described herein above, the monolithic three-dimensional multi-layered ceramic structure is preferably comprised of a plurality of thin ceramic layers of at least 50 μm.

In the modular reactor system according to the invention as described herein above, the at least one module further preferably comprises an active material present within the ceramic carrier structure. The active material may advantageously be a catalytically active and/or adsorptive material.

The ceramic support layer preferably may be a porous or non-porous material, more preferably the ceramic material is porous material, more preferably comprises alumina, titania, silica and/or zirconia.

The term "porous" herein refers to structures with pore sizes between 1 and 15 μm and interconnected, open porosities between 30% and 45%.

Preferably, it may be prepared from particulate materials that form ceramics, such as silicon carbide, silicon nitride, mullite, cordierite, beta spodumene, phosphate ceramics, such as e.g. zirconium phosphate, or combinations thereof.

Preferably, the ceramic powders form mullite or cordierite. Preferred examples of ceramics include silica, alumina, aluminum fluoride, clay, fluorotopaz, zeolite, and mixtures thereof.

Different composition means that, after sintering, the compositions have a readily discernable microstructural difference (e.g., porosity, crystalline structure or grain size) or chemical difference by typically employed techniques for characterizing ceramics.

The mixture may contain other useful components, such as those known in the art of making ceramic suspensions. Examples of other useful components include dispersants, deflocculants, flocculants, plasticizers, defoamers, lubricants and preservatives. A preferred binder in the mixture is one that is soluble in the dispersing liquid, but not soluble in water.

The mixture may also contain binders. Examples of binders include cellulose ethers, preferably, the binder is a methylcellulose or ethylcellulose.

"Porous" herein has the meaning of ceramic material having an adequate permeability, related to pore size, porosity, and configuration. Preferably the porous material has a pore size of 0.1-10 μm, a porosity of 15 to 85%, and a Pore Volume Distribution of from 100 and 0.003 μm, as determined by ASTM D4284.

Preferably, the catalyst or adsorbent material is formed on a plurality of surfaces of the porous ceramic material prior to, or post firing, e.g. when sintered. Preferably, the catalyst material may be entrapped within a plurality of voids formed in the porous ceramic material prior to, or post firing/sintering.

The support layer may alternatively also be advantageously formed on a surface of the plurality of channels, e.g. using a negative printed form upon which the ceramic or otherwise suitable material may be applied: the negative may then be dissolved or molten or otherwise removed, leaving the positive support layer. One example includes a wax or polyolefin material that may suitably melted away. In another example, the negative form may be a ceramic material that may be dissolved once a positive form of e.g. a molten metal alloy is formed on the negative form, in a dipping process.

The modular reactor system according to the invention as described herein above preferably further comprises at least two independent fluid conduit systems that are not fluidly connected to one another, such that each system may comprise a different fluid stream. Preferably, one of the conduit systems is operable as product/reactant flow chamber/reaction chamber, and wherein the at least second system is operable as heat exchange system.

More preferably, one of the conduit systems may be operable as product flow chamber, and the at least second system may be operable as separation unit, wherein the boundary between the two systems may act as a selective product removal membrane.

The system further preferably includes at least a sensor, preferably one of a temperature sensor, a viscosity sensor, visual, e.g. opacity sensor; a flow sensor, a pressure sensor, a density sensor, each individually or all of them included into the system for providing feedback control, through a feed rate or general conditions, e.g. density, of the input of reactants or heat exchange medium.

Preferably, the reactor system comprises at least two or more modules, each module comprising one or more monolithic three-dimensional multilayer ceramic structure(s), thereby defining a unit process zone.

The system may advantageously comprise a catalyst or (ad)sorbent material formed in combination with the porous ceramic support layer, the catalyst or (ad)sorbent preferably being co-fired with the monolithic three-dimensional multilayer ceramic structure, or applied after the firing of the ceramic structure.

Preferably, the reactor system comprises at least one inlet channel for reactant streams; and at least one outlet channel for reactants and products, each in fluidic communication with the reaction modules.

Preferably, the reactor system comprises a reactant vessel printed into a module of the reactor system, or it may comprise separate reactor vessel housing one or more modules.

The subject invention also relates to a process for forming a module for a modular reactor system according to any one of the previous claims, the method comprising the steps of:
 a. providing a ceramic precursor additive material;
 b. depositing the at least one ceramic precursor additive material in subsequent layers to form a pre-ceramic 3-dimensional structure; and
 c. firing the pre-ceramic additive material and, optionally, to form a ceramic carrier structure. In step (c), the firing conditions are preferably chosen such that they involving debinding and sintering.

Preferably the process further comprises depositing a catalyst precursor material that can be co-fired with the pre-ceramic additive material, and co-firing the formed ceramic structure with the immobilized catalyst deposited thereon, or applying the catalyst or catalyst precursor material after the firing of the ceramic structure. Alternatively, at least in part, a porous ceramic support layer is being formed on a surface of the plurality of channels, forming a positive layer over a negative base additive manufactured scaffold.

Preferably the process further comprises forming an additive manufactured, heat untreated finished reactor module, herein referred to as a "green" reactor module in an additive manufacturing system wherein the "green" module is converted to a monolithic ceramic composite module, comprising the steps of:
 d. selecting a firing-removable particulate or liquid binder material;
 e. blending the liquid or particulate binder material with a particulate material (powder) selected from at least one of a metal powder, a carbide powder, a ceramic powder and a mixture thereof, to obtain a blended ceramic precursor material;
 f. depositing a plurality of layers of the ceramic precursor material into a three-dimensional reactor module green body structure; and
 g. subjecting the green body structure to a firing process in a furnace to remove the binder component, and to convert the pre-ceramic-"green" body structure to a ceramic composite structure, preferably with a wall thickness in a range of from 1 μm 30 millimeters. Herein a difference can be made between parts of the module that may mainly serve for stability reasons, e.g. load or pressure bearing walls, and baffles or otherwise structures that do not need to contribute to the load or pressure dissipation as much as the load bearing structures. Preferred are wall thicknesses of from 10 μm to 50 μm, and from 100 μm to 15 mm, respectively.

Preferably in the process the depositing of the plurality of layers of the polymer precursor resin and powder blend is computer controlled, preferably by a three-dimensional printing process.

Preferably in the process the binder is selected from a polymer that is liquefiable and/or decomposable at the elevated temperature as present in the furnace during firing. Preferably the binder further comprises other components selected from a metallic powder, a ceramic powder, graphite powder, graphene powder, diamond powder, carbide powder, silicide powder, nitride powder, graphene, carbon nanofiber, carbon nanotubes, and mixtures thereof.

In step g., the optionally dried green body is suitably fired by heating to a sufficient top temperature for a sufficient time to result in a fired ceramic body.

The firing conditions may be varied depending on the process conditions such as specific composition of the batch, size of the green body, and nature of the equipment. The green body is preferably heated in a furnace to the highest temperature of the firing cycle preferably in the temperature range having an upper limit below 1550° C. and a lower limit of above 1350° C., and in some embodiments below 1460° C. and above 1420° C. and held at this temperature range preferably for greater than 4 hours; more preferably between 4-30 hours; and more preferably yet between 6-20 hours. During firing, a predominant ceramic crystal phase may be formed in the ceramic article.

The subject invention also relates to the use of a reactor system or a system as obtained in a process for industrial scale processes, in particular for the (petro)chemical industry.

It should be understood that while the present invention has been described in detail with respect to certain illustrative and specific embodiments thereof, it should not be considered limited to such, as numerous modifications are possible without departing from the broad scope of the present invention as defined in the appended claims.

The invention claimed is:

1. A modular reactor system for carrying out processes on an industrial scale comprising mixing, chemical reactions, heat exchange and/or separations of chemical reactants and/or (by)products, the reactor system comprising of at least one additive manufactured module, the module being configured for performing at least one process, and optionally, an external housing,
wherein the industrial scale process has an entrant fluid minimum flow rate of at least 5 liters per hour,
wherein the additive manufactured module comprises a reaction space having a mean major diameter of at least 5 cm, and a mean major height of at least 10 cm; and
wherein the additive manufactured module comprises a porous ceramic material with a section of at least one of: a catalyst material and a sorbent material;
wherein the section is formed with the catalyst material or the sorbent material comprised in the additive manufactured module.

2. The reactor system according to claim 1, wherein the system comprises at least two consecutive modules.

3. The reactor system according to claim 1, wherein the catalyst material or sorbent material is formed on a plurality of surfaces of the porous ceramic material.

4. The reactor system according to claim 1, wherein the processes comprise at least two of mixing, adsorption and/or desorption, optionally catalyzed and/or uncatalyzed chemical reactions, heat exchange, and/or product separation.

5. The reactor system according to claim 1, comprising at least two different modules for performing at least two different processes.

6. The reactor system according to claim 5, wherein the at least two different processes comprise at least one of: a combination of mixing and chemical reactions; a combination of a chemical reaction and heat exchange; and a combination of a chemical reaction and a separation.

7. The reactor system according to claim 6, wherein at least one module is configured to perform at least two processes.

8. The modular reactor system according to claim 7, wherein the additive manufactured module is configured to operate at pressures up to 1000 Bar absolute and temperatures up to 1200° C.

9. The modular reactor system according to claim 7, wherein the additive manufactured module is configured to operate at a temperature in a range from 150° C. to 450° C.

10. The reactor system according to claim 1, comprising between 2 and more than 50 reactor modules arranged in stacked manner and consecutive order according to a product flow direction.

11. The reactor system according to claim 10, wherein the modules are arranged to provide a flow direction that is essentially horizontal or vertical.

12. The reactor system according to claim 1, wherein at least one reactor module comprises one or more mixing sections forming a static mixer.

13. The reactor system according to claim 1, wherein at least one reactor module comprises one or more catalyst and/or sorbent sections.

14. The reactor system according to claim 1, wherein the additive manufactured module comprises a passive, and/or active heat exchange system.

15. The reactor system according to claim 1, wherein at least one reactor module comprises a separation unit.

16. The reactor system according to claim 1, wherein at least two modules comprise common reaction chambers and/or heat exchange fluid medium channels lines connected to one another.

17. The reactor system according to claim 16, wherein the reactor chamber and/or heat exchange channel at an initial chamber in a first module is different from the reactor chamber or channel volume and/or geometry in a second consecutive module.

18. The reactor system according to claim 1, wherein each module comprises a ceramic carrier structure defining at least one ceramic cavity, the at least one ceramic cavity having a defined surface area and defined geometry.

19. The reactor system according to claim 18, wherein the ceramic carrier structure is a monolithic three-dimensional ceramic structure.

20. The reactor system according to claim 1, wherein the catalyst or sorbent material is entrapped within a plurality of voids formed in the porous ceramic material.

21. The reactor system according to claim 1, wherein the additive manufactured module further comprises a gas-impermeable, non-porous ceramic material.

22. The reactor system according to claim 1, wherein the additive manufactured module is formed from a ceramic material selected from the group consisting of silicon carbide, silicon nitride, mullite, cordierite, beta spodumene, phosphate ceramics, zirconium phosphate, alumina, titania, silica, and zirconia.

23. A modular reactor system for carrying out processes on an industrial scale comprising mixing, chemical reactions, heat exchange and/or separations of chemical reactants and/or (by)products, the reactor system comprising:
   at least one additive manufactured module comprising a ceramic material, the module being configured for performing at least one process at a temperature up to at least 450° C.; and optionally, an external housing;
   wherein the industrial scale process has an entrant fluid minimum flow rate of at least 5 liters per hour; and
   wherein the module comprises a reaction space having a mean major diameter of at least 5 cm, and a mean major height of at least 10 cm; and
   wherein the ceramic additive manufactured module is formed with at least one of a catalyst material and a sorbent material.

* * * * *